United States Patent Office 3,390,153
Patented June 25, 1968

3,390,153
PROCESS FOR PREPARING 4-METHYL-5-ALKOXY OXAZOLES
John M. Chemerda, Watchung, and Elbert E. Harris, Westfield, N.J., assignors to Merck & Co., Inc., Rahway, N.J., a corporation of New Jersey
No Drawing. Filed Nov. 5, 1965, Ser. No. 506,576
4 Claims. (Cl. 260—307)

This invention relates to 4-methyl-5-alkoxy oxazoles. More particularly, it is concerned with a new process for preparing these oxazoles.

The 4-methyl-5-alkoxy oxazoles, which are useful as intermediates in the preparation of Vitamin $B_6$, have heretofore been prepared by reacting an alkyl N-formyl-α-alaninate with phosphorous pentoxide. However, this process is difficult and expensive to carry out on a commercial scale and hence other methods for preparing these oxazoles have been sought.

It is an object of this invention to provide an improved process for preparing 4-methyl-5-alkoxy oxazoles suitable for preparing these products on a commercial scale. Other objects will be apparent from the detailed description of this invention hereinafter provided.

In accordance with this invention, it is now found that 4-methyl-5-alkoxy oxazoles are conveniently prepared by reacting an alkyl α-diazopropionate with hydrogen cyanide. This reaction can be shown structurally as follows:

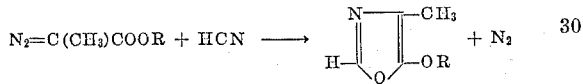

wherein R represents an alkyl group.

The reaction of the alkyl α-diazopropionate with hydrogen cyanide is effected by intimately contacting a mixture of the reactants at a temperature between about —20° C. to 150° C. for sufficient time to complete the reaction. The formation of the desired alkoxy oxazole is usually complete when the evolution of nitrogen gas from the reaction mixture ceases. At low temperatures between about —20° C. to 50° C., the reaction is very slow and is preferably effected in the presence of a suitable copper-containing catalyst such as copper powder, copper bronze powder, or an inorganic copper salt, for example, copper sulfate. At the higher temperature between about 50° C. and 150° C., the reaction rate is usually rapid and it is generally not necessary to add a catalyst, although it can also be added under these conditions if it is desired to speed up the reaction rate. At these higher temperatures, the process is most conveniently carried out under pressure in a suitable reaction vessel. The process of this invention is conveniently carried out in the presence of a suitable inert organic solvent for the reactants such as ether, dioxane, tetrahydrofuran, and the like, although the presence of such a solvent is not required. Generally, it is preferred to carry out the reaction with a lower alkyl ester of the α-diazopropionic acid, since the use of these estres results in maximum yields of the desired oxazole under optimum conditions. Also, the lower alkyl esters such as the methyl, ethyl, propyl, amyl and the like are more conveniently prepared and are less expensive than the higher alkyl esters.

When the reaction between the alkyl α-diazopropionate and hydrogen cyanide is complete, the desired oxazole is readily recovered by removing any excess hydrogen cyanide from the reaction mixture and extracting the product with a suitable inert organic solvent such as methylene chloride, chloroform, benzene, ether, and the like. Upon evaporating the resulting solvent extracts, the desired oxazole can be recovered.

The alkyl α-diazopropionates used as starting materials in the process of this invention can be made in accordance with processes known in the art. For example, a concentrated ether solution of the diazopropionate can be prepared by diazotization of the alkyl α-alaninate, extraction of the resulting diazo salt with ether, and concentration of the ether solution to form a concentrated solution of the diazopropionate in ether.

The following example is presented to illustrate a process for carrying out this invention.

Example 1.—Preparation of 4-methyl-5-ethoxyoxazole

A solution of 2.56 g. (0.02 mole) of ethyl α-diazopropionate in 5 ml. of ethyl ether is cooled and added to a well-stirred suspension of 2.0 g. of anhydrous copper sulfate in 40 ml. of cold liquid hydrogen cyanide at 0° C. in a flask fitted with an efficient reflux condenser held at —12° C. and a trap to exclude moisture. The mixture is warmed and stirred overnight at gentle reflux, by which time evolution of nitrogen has ceased. Then the excess hydrogen cyanide and ether are distilled off. The residue is triturated with three 30-ml. portions of methylene chloride and the combined methylene chloride extracts are concentrated at atmospheric pressure to a volume of about 10 ml. and then carefully distilled at 50 mm. pressure. The fraction boiling at 48–50° C., which is 4-methyl-5-ethoxy oxazole, is collected and found to have a boiling point and ultraviolet and infrared absorption spectra similar to those of an authentic sample.

When butyl α-diazopropionate, propyl α-diazopropionate, and amyl α-diazopropionate are used in place of ethyl α-diazopropionate in the process of the foregoing example, 4-methyl - 5 - butoxy oxazole, 4-methyl-5-propyloxy oxazole, and 4-methyl-5-amyloxy oxazole respectively are obtained.

What is claimed is:
1. A process for preparing 4-methyl-5-lower-alkoxy oxazoles which comprises reacting a lower alkyl ester of α-diazopropionic acid with hydrogen cyanide.
2. The process of claim 1 wherein the reaction is effected in the presence of a copper catalyst.
3. The process for preparing 4-methyl-5-ethoxy oxazole which comprises reacting ethyl α-diazopropionate with hydrogen cyanide in the presence of copper sulfate.
4. The process which comprises reacting ethyl α-diazopropionate with hydrogen cyanide in the presence of copper sulfate and recovering 4-methyl-5-ethoxy oxazole from the resulting reaction mixture.

References Cited
UNITED STATES PATENTS
3,282,952   11/1966   Schaeren _____ 260—307

ALTON D. ROLLINS, Primary Examiner.